Feb. 5, 1952  A. R. BLACKBURN ET AL  2,584,109
MOLD AND METHOD FOR MOLDING CERAMIC WARE
Filed March 12, 1947  2 SHEETS—SHEET 1
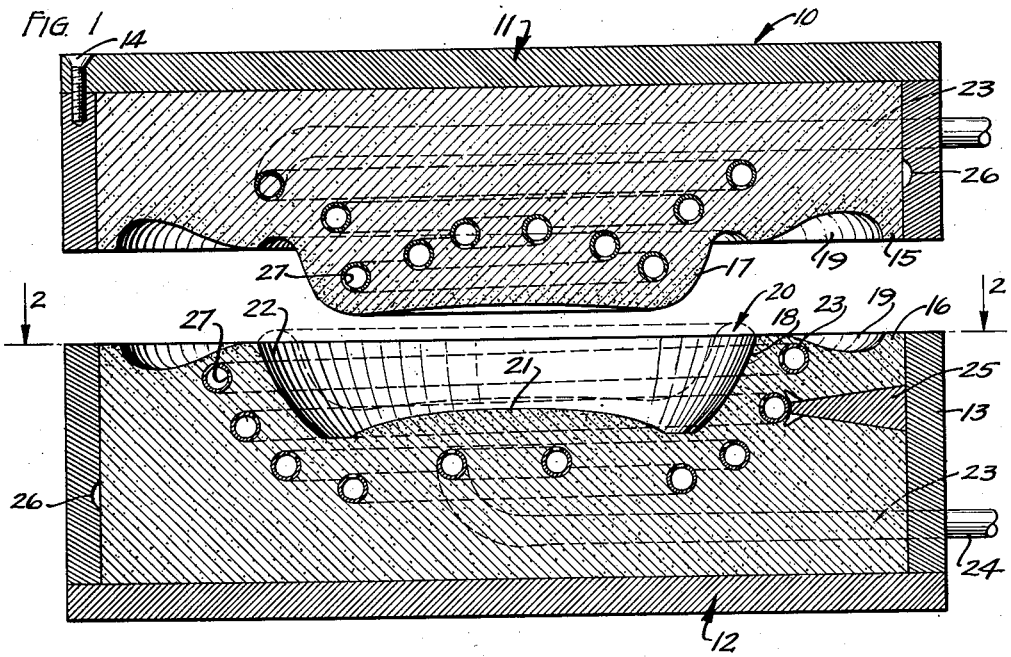
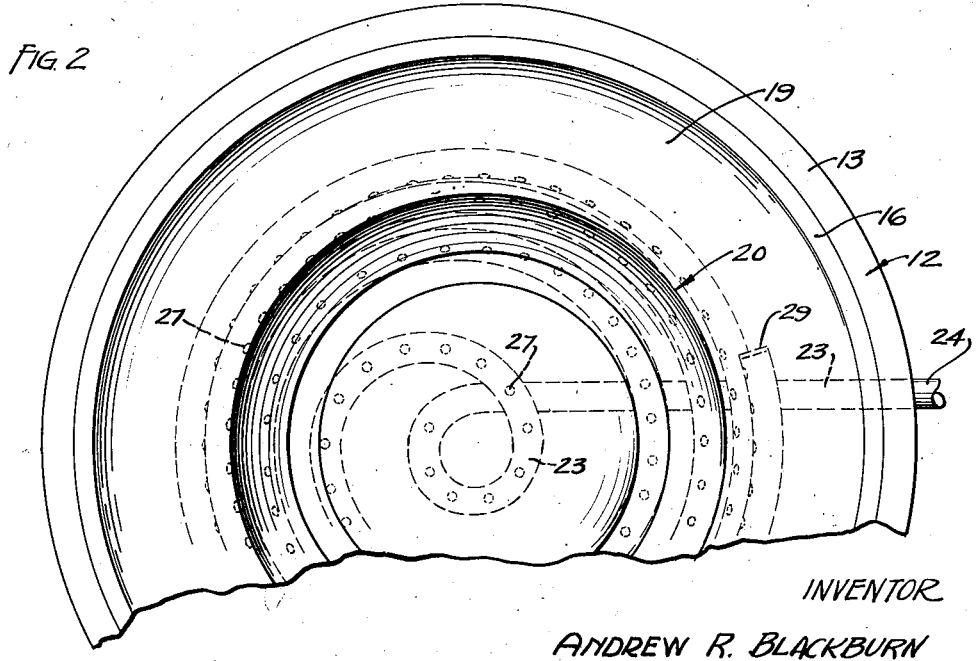
INVENTOR
ANDREW R. BLACKBURN
RICHARD E. STEELE
BY
Semmes, Keegin, Robinson and Semmes
ATTORNEYS Feb. 5, 1952     A. R. BLACKBURN ET AL     2,584,109
MOLD AND METHOD FOR MOLDING CERAMIC WARE
Filed March 12, 1947     2 SHEETS—SHEET 2
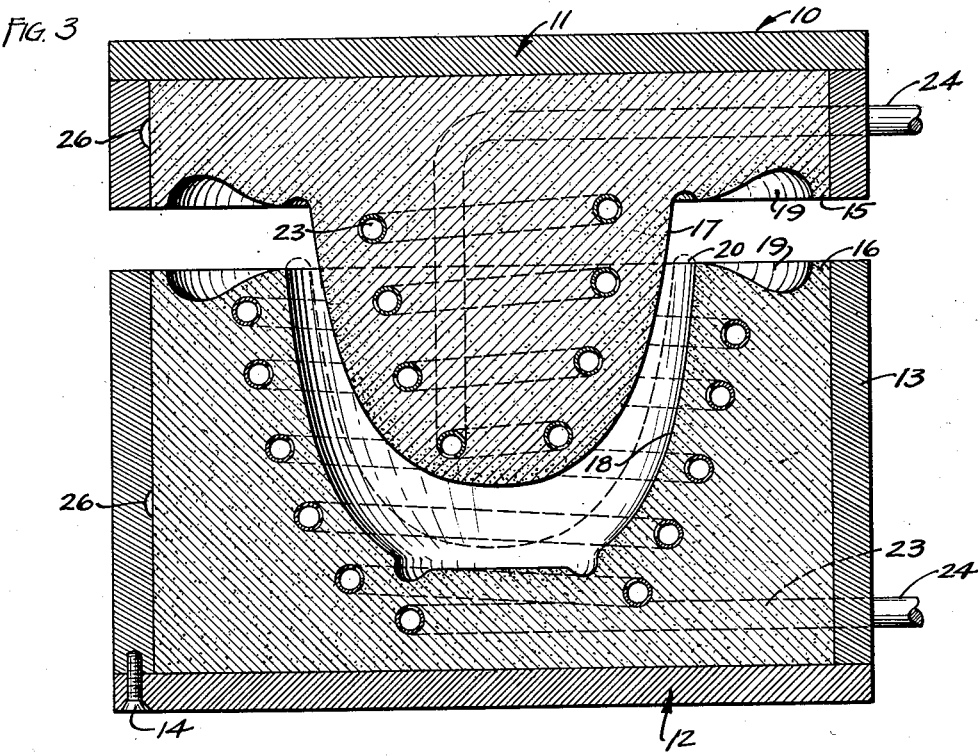
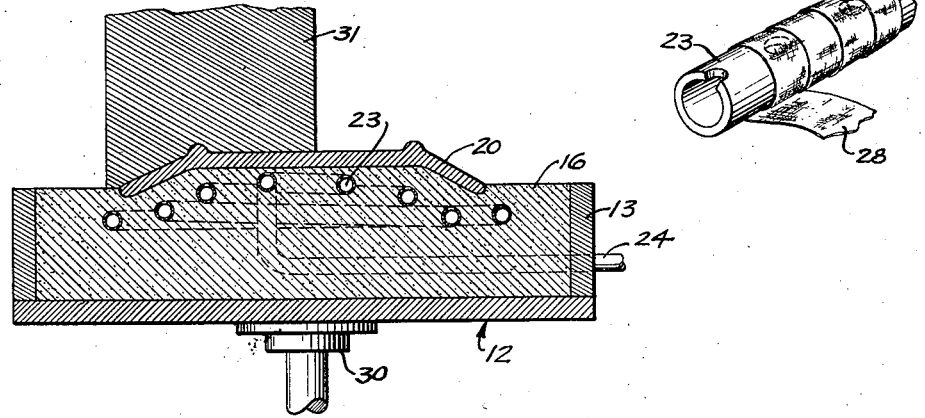
INVENTOR
ANDREW R. BLACKBURN
RICHARD E. STEELE
BY
Semmes, Keegin, Robinson and Semmes
ATTORNEYS Patented Feb. 5, 1952

2,584,109

UNITED STATES PATENT OFFICE 2,584,109

MOLD AND METHOD FOR MOLDING CERAMIC WARE

Andrew R. Blackburn and Richard E. Steele, Columbus, Ohio, assignors to Ram, Inc., Detroit, Mich.

Application March 12, 1947, Serial No. 734,174

7 Claims. (Cl. 25—129)

The present invention relates to the manufacture of pottery ware, and has particular reference to methods and apparatus for forming clay objects to produce uniformly shaped ware of sound structure, prepared for subsequent finishing treatment.

In some methods of forming pottery ware, the clay object is separated from the faces of the mold by shrinkage inherent in the object upon losing its water of plasticity. The shrinkage characteristics of different clay masses vary considerably, in accordance with the normally encountered variance of the water retentive properties of the clay employed. This factor, in addition to the slowness of water evaporation, has prevented rapid production of pottery ware, due to resultant deviation of the clay products from permissible standards of uniformity. Heretofore, it has been necessary to employ large numbers of molds in an object forming operation to overcome to some extent the delay inherent in shrinkage release of the objects from the molds.

Porous molds have been employed to accelerate water absorption from the clay mass. Shrinkage of the clay object thus becomes a function of the porosity of the mold and the water retention capabilities of the clay mass. While the production rate is accelerated, the presence of two variable factors effecting shrinkage augments lack of uniformity in the product.

This is especially the case in the manufacture of clay objects in irregular or asymmetrical shape. With the molding of a clay object having different thickness measurements the overall shrinkage rate is impossible to anticipate, except by tedious experiment with different types of clays and repeated object casting until a perfect object is produced. Generally, irregular shrinkage results in a high percentage of breakage during and subsequent to removing the object from the mold faces, and shattering during the finishing operations from stresses developed in the ware structure. This is particularly the case with ware having, for example, a thin base and thickened sides, or vice versa.

Attempts have been made to control ware shrinkage on the mold by carrying the clay object through a series of water removing stations, employing permeable molds to accelerate absorption of water content. Fluid pressure means are provided to flush the permeable molds of absorbed water, upon removal of the ware. However, the shrinkage principle is employed to effect actual separation of the ware from the mold faces, with the above mentioned difficulties and disadvantages obtaining.

It has been suggested heretofore that clay objects may be removed from molds by the direct application of fluid pressure against the ware through a pressure conduit extending through a section of the mold to the surface thereof, opening adjacent the clay object. In this manner, the clay object is separated from the mold section independently of object shrinkage. However, the concentration of air pressure against a specific portion or portions of the clay structure, causes deformation thereof adjacent the pressure conduit, and results in a prohibitively high percentage of breakage or malformation. The method, as presently understood and practiced, cannot be employed with asymmetrically shaped ware of varying thicknesses, or more fragile clay objects.

The present invention has for an object the provision of a novel method and means for the manufacture of pottery ware, wherein the above mentioned disadvantages are obviated.

A further object is to provide a novel method and apparatus for forming clay objects which may be employed in combination with present pottery manufacture methods to increase markedly the production rate. The invention is particularly advantageous for combination with processes unsuccessful due to limitation in handling certain types of clay, and unsatisfactory object release from the molds, causing the object to warp or crack.

A further object is to provide a novel method and apparatus for the manufacture of clay objects wherein the object is removed from the mold with retention of integrity of shape of the object, lending to absolute product uniformity.

A further object is to provide a method and apparatus for the manufacture of pottery ware wherein through quick release of the object from the mold, a high speed production rate is attained, without sacrificing the quality of product, with marked reduction of unit cost.

A further object is to provide a method and apparatus for forming ware wherein adherence of the clay object to the mold face or faces can be controlled by the operator.

A further object is to provide a novel method and apparatus for forming ware of any shape or thickness wherein the effect of differential shrinkage on separation of a clay object from the mold, is eliminated, and the number of molds necessary for accomplishing a continuous object forming operation is minimized.

A further object is to provide a novel method for effecting the quick release of clay objects from mold surfaces, without injuring the ware, before normal shrinkage occurs.

A further object is to provide a novel method and apparatus for the manufacture of asymmetrically shaped clay objects.

Still a further object is to provide a novel mold for use in shaping clay masses which is inexpensively and easily fabricated, permitting of frequent design changes, and which is adaptable for use with presently employed clay shaping processes and apparatus.

Other objects and advantages of the present invention will be found in the following detailed description thereof and the accompanying drawings, wherein:

Figure 1 is a vertical section of the mold of the present invention, with the male and female mold sections separated;

Figure 2 is a partial top plan view of the female mold taken along the line 2—2 of Figure 1;

Figure 3 is a vertical section of a mold for use with a different shape ware;

Figure 4 is a vertical section of a jiggering apparatus embodying the invention; and Figure 5 is a perspective view of a portion of fluid pressure conduit employed in forming the mold.

In its broadest application, the invention comprises a novel method and means of separating clay objects from mold surfaces by the application of fluid pressure uniformly against the face of the clay object desired to be separated, controlling the pressure in selected areas in accordance with the requirements of object thickness and shape. The source of pressure is so disposed in relation to the contour and any selected area of the object as to provide a predictable, controlled force in the form of a pressure blanket exerted simultaneously across the entire surface area of the clay object, in accordance with a pre-selected pressure pattern, whereby release of the clay object from the mold surface is accomplished without imparting undue shock or strain to the object or any part thereof.

The invention may be employed satisfactorily with known clay forming processes wherein the clay is tempered, with water or other plasticizing mediums, and which normally employ shrinkage release of the clay object from the mold. Such processes are characterized by extremely slow rate of production, to accelerate the process, improve the uniformity of the ware products, and eliminate use of a multiplicity of molds. However, the invention is most advantageously employed with clay forming processes wherein shrinkage release of the clay object from the mold is difficult or impossible, such as in the manufacture of asymmetrical clay objects or very thin, fragile ware. The invention permits of employing mass production methods in this type of ware manufacture.

For example, the invention may be employed with jiggering, drain and solid casting, plastic pressing and dry pressing methods. For purposes of illustration, the invention will be described as employed in plastic pressing and jiggering type operations. It will be readily apparent, however, that the principles of the invention may be applied equally well to other common methods of forming pottery ware.

Referring to the drawings, the numeral 10 refers generally to a mold constructed in accordance with the invention, including a top or male section 11 and a bottom female section 12. The molds are adapted for use with suitable pressure jigs, not shown. The mold is formed in a casing 13, which may be constructed of any corrosion resistant material such as alloy steel, which may be assembled by welding, or by screws 14. The joints of the casing 13 should be sealed, to avoid moisture and pressure seepage from the sections 11 and 12 when employed in a molding operation. To this end, suitable gaskets, not shown, may be provided at the casing joints to ensure controlled distribution of fluid pressure within the sections of the mold 10.

The bodies 15 and 16 of the mold sections 11 and 12 are formed of a material capable of hardening upon standing to form a solid porous and permeable element characterized by an ability to absorb moisture. A high grade of gypsum plaster may be employed. It is preferred to use a hard gypsum cement in view of its extreme hardness, which markedly prolongs the life of the mold. The plaster body should have high permeability and porosity, in order to attain the desired speed of operation of the mold. Air bubbles formed in the plaster during mixing should be removed by subjecting the plaster to a suitable drawing step at reduced pressures, in order to prevent formation of irregularities in the mold structure which appear as the surfaces are subjected to wear.

The mold bodies 15 and 16 are provided with molding faces 17 and 18 by impression with suitable forms prior to hardening of the plaster. A cavity 19 receives excess clay expressed from a clay object 20 during a molding operation. As shown in Figures 1 and 2, the clay object 20 comprises a clay mass pressed to the shape of a shallow dish having a thin base 21 and relatively thickened sides 22.

In accordance with the present invention, fluid pressure means are formed in the plaster bodies 15 and 16 for effecting removal of the clay object 20 from either or both of the mold faces 17 and 18, prior to shrinkage normally occurring upon drying out of the clay. Said means include a conduit 23 having an extension 24 passing through the walls of the mold to a source of fluid pressure, not shown. The conduit 23 may preferably comprise a tubular member formed of an easily workable material which is corrosion resistant, such as a metal. The conduit 23 may be supported against radial displacement by a bracket member 25, which may be several in number formed to engage with any section of the conduit as desired. In some instances it may be advantageous to provide a support 25 on the base of the mold 12, not shown, in order to secure the conduit 23 firmly as the plaster hardens. The plaster casts 15 and 16 may be locked in the molds by hollowing out the walls 13 at different portions thereof 26, thereby preventing accidental displacement of the plaster casts in or from the molds upon the application of fluid pressures to the conduit 23.

The conduit 23 is apertured as at 27 along its length, the apertures opening into the body of the plaster molds. The apertures 27 are formed to provide a plurality of streams of fluid pressure in a direction generally perpendicular to the contour of the clay object 20, to provide an evenly dispersed blanket of pressure across the face of the clay object 20 adjacent the mold surface 18. The conduit 23 is pre-shaped to provide evenly spaced sources of fluid pressure about the entire face of the object 20. To accomplish this, the conduit 23 preferably is formed as a helix, with the coils thereof positioned internally of the mold body away from the face of the mold but generally parallel to the contour of the clay object 20.

The spacing and size of the pressure apertures 27, and the distance between a section of the conduit 23 and the adjacent face of the clay object 20, determine the amount of fluid pressure which will be exerted on a portion of the clay object 20. By adjusting these variables, a controlled adherence of the clay object 20 to the mold surfaces is accomplished. The operator may obtain adherence of any portion of the ware to any desired part of the mold for a preferred length of time, by exercise of this available control of the ware releasing pressure. Thus, regardless of the relative or differential thicknesses of the several parts of the ware, as for example the plate shown in Figure 1, a fully controlled quick release of the object from the mold may be accomplished, without danger of injury to the ware from the ever present tendency to crack at the thin points, upon the application of pressures thereto.

As shown in Figure 5, it is preferred to enclose the conduit 23 with a wrapping of a permeable fabric material such as gauze 28. The gauze serves the double purpose of maintaining the apertures 27 free from obstruction through the accumulation of particles of plaster, and provides a pressure chamber between the plaster and the conduit 23. This chamber facilitates building up of a fluid pressure head outside the conduit 23 in the body of the porous plaster mold in the direction of the mold face, accelerating the passage of the fluid pressure through the body of the mold. The conduit 23 is plugged as at 29, to form a dead end in the mold body.

The invention, as applied to a conventional jiggering apparatus and operation, is illustrated in Figure 4. The mold 12 is carried by a rotating support table 30. The clay object 20, shown for example as dinner ware, is shaped by contact with a fixed shaping tool or template 31. When the shaping operation is completed, the fluid pressure conduit extension 24 is connected to a suitable source of fluid pressure, and the object 20 is separated from the mold surface, before normal shrinkage occurs.

The method of manufacture of the mold 12 and the structure thereof is more fully disclosed and claimed in a copending application No. 737,544 entitled "Mold and Method of Manufacture," filed March 27, 1947. It is pointed out therein that the conduit 23 may also be formed advantageously by casting with wax or a low melting point metal alloy such as a bismuth alloy, which is removed by subjecting the mold to elevated temperatures as soon as the plaster hardens.

In operation, the principle of the invention may be employed in the manufacture of ware from any type clay. As separation from the mold is accomplished prior to shrinkage of the clay object, the unpredictable results obtaining from the differing contraction properties of different types of clays, are eliminated as a production factor. Accordingly, the invention may be used to speed up plastic pressing or casting methods of ware manufacture, which normally require an hour or more for adequate object shrinkage to occur before the clay object separates from the mold.

The plastic clay mass which may be wet or damp clay is placed on the mold face 18 and the male and female sections 11 and 12 of the mold brought into registration with the exertion of forming pressures on the clay mass. Expressed moisture is absorbed by the porous molds, causing the clay particles to adhere, forming the object 20. Excess clay is extruded into the cavity 19. A fluid pressure such as air pressure is impressed immediately prior to release of the molding pressure upon a selected one of the conduits 23, for example the conduit in the bottom mold 13. As the mold sections are separated, air pressure passes through the apertures 27 into the porous plaster body of the mold and filters therethrough to impress a blanket of pressure evenly across the face of the object 20, releasing the object instantaneously from the adjacent face of the mold 13.

The clay object 20 will remain affixed to the face of the upper mold 11, and may be moved to a desired point before the quick release operation is repeated to separate the object 20 from the mold 11. This step by step separation of the object 20 from the mold surfaces accelerates the speed of and increases the degree of control which may be exercised over the object forming operation, considerably reducing the number of molds heretofore required for a plastic pressing operation of this type.

As shown in connection with Figure 1, the ware releasing pressures are controlled in accordance with the dimensional variations of the clay object, in order to reduce the application of pressures at the structurally weaker points of the ware. In this instance, a shallow dish is shown, having the relatively thin bottom 21. Accordingly, the coils of the conduit 23 are spaced more remotely therefrom, than the conduit sections adjacent the thicker side walls of the clay object 20. The principle is shown in more marked degree in the forming of the conduit 23 in the upper mold 11. If desired, the control of adherence of the clay object to the mold face may be further refined by modifying the size of the apertures 27. The air pressures may be further controlled by increasing or decreasing the thickness of the permeable fabric wrapping 28, to the end of presenting maximum air pressures at the thicker portions of the ware surfaces.

In some instances, it may be desired to block off ware releasing pressures completely from a particular area, after the mold is formed. This may be accomplished by rendering selected areas impervious to fluid pressure by applying a material which will seal off the pores of the mold in that area, such as a varnish or plastic.

The invention is particularly applicable to the molding of clay objects of asymmetrical dimension, wherein variances in the normal rate of clay object shrinkage caused by large dimension differentials render manufacture by the usual methods impracticable. Employing the principles of the invention, asymmetrical objects such as sculpture, terra cotta and other larger forms, may be mass produced with a markedly low incidence of breakage, with any of the commonly used methods of manufacture.

Removal of excess moisture from the molds may be accomplished by blowing moisture therefrom, by heating, or other special treatment. It is advantageous to employ hot dry air to effect the quick release of the clay objects, materially reducing the moisture absorbed by the mold. A vacuum may be impressed upon the conduit 23 alternately to the positive pressures employed in the quick release operation, in accordance with the invention disclosed and claimed in copending application Serial No. 737,544 filed March 27, 1947.

The fluid pressures employed may vary in accordance with the delicacy or conformation of the ware being treated. Simple experiment will reveal the maximum pressures which may be employed in a particular instance, to attain maximum production rate with minimum wastage. With the type of ware shown in the drawings, with a moderately dense porous plaster mold, 50 to 80 lbs. air pressure is satisfactory.

It will be observed that the present invention provides a novel method and means for forming clay objects. Possible specific uses include the manufacture of dinner ware, art ware including sculpture, decorative tile, terra cotta, refractories, and electrical porcelains. The controlled adherence principle of the invention may be employed to advantage with all ware forming processes, allowing release of the ware from the molds at any point in the manufacturing operation subsequent to shaping.

Other obvious adaptations of the invention will occur to one familiar with the art. The invention comprehends the substitution of equivalents, where possible, and is to be limited only as defined in the appended claims.

We claim:

1. A method of forming ware of asymmetrical shape and having different thicknesses comprising forming a mass of wet clay, shaping the clay upon a surface, reducing the water content of the clay until the clay adheres to form an object, and impressing fluid pressure against the face of the asymmetrically shaped object adjacent the surface to separate the object from the surface, the fluid pressure being the greatest against the thickest portions of the asymmetrically shaped object whereby the object is separated from the mold without strain.

2. A method of forming ware of asymmetrical shape and varying thickness comprising forming a mass of wet clay, shaping the clay upon a porous mold, squeezing excess water content from the clay to form a clay object, applying fluid pressure against the entire face of the asymmetrically shaped object adjacent the mold, and controlling the fluid pressure to reduce the fluid pressure adjacent the relatively thin portions of the face of the object and to increase the fluid pressure adjacent the relatively thick portions thereof, whereby the object is separated from the face of the mold without strain on the object structure.

3. Apparatus for the manufacture of asymmetrically shaped pottery ware of varying thickness comprising cooperable means for shaping a wet clay mass to form a clay object, at least one of said cooperable means comprising a porous mold having a contoured face for receiving and forming a face of the asymmetrically shaped object, and means in said porous mold for applying fluid pressure against the face of the object adjacent the mold face to remove the object therefrom, said fluid pressure means having portions positioned closer to the mold surface opposite thicker portions of the ware body to provide pressure at points along the said object face controlled in degree in accordance with the relative thickness of the object at said point.

4. A method of forming ware having different thicknesses comprising forming a mass of clay, shaping the clay on a surface, and impressing fluid pressure against the face of the shaped clay to separate the clay from the surface, the fluid pressure being greater against the thicker portions of the shaped clay whereby the shaped clay is separated from the surface without strain or distortion of the thinner portions.

5. A method of forming dish shaped pieces of ware having rim, side and base portions comprising pressing wet clay on a porous mold to shape the object, and injecting fluid pressure through the mold body against the surfaces of the dish shaped piece of ware with greater pressure being applied to the base than to the sides and rim of the ware.

6. A method of forming ceramic ware comprising pressing a plastic clay mass to the desired shape between cooperable permeable mold parts to form the ware, passing air through one of the mold parts to exert a pressure between that mold part and the ware to separate that mold part from the ware while the ware is supported on a remaining mold part, passing air through said remaining mold part to exert a pressure to separate the easily deformable, plastic ware therefrom, and varying the pressure exerted between the ware and said remaining mold part in selective areas thereof in accordance with the thickness and shape of the ware to avoid strains and distortion in the ware.

7. A method of forming ceramic ware comprising pressing a plastic clay mass to the desired shape between cooperable mold parts of permeable material to form the ware, passing air through the permeable mass of one of the mold parts to exert a pressure between that mold part and the ware to separate that mold part from the ware while the ware is supported on the remaining mold part, and then passing air through the permeable mass of said remaining mold part to exert a pressure to separate the unsupported ware while in an easily deformable plastic condition completely from the other mold part.

ANDREW R. BLACKBURN.
RICHARD E. STEELE.

REFERENCES CITED

The following references are of record in the file of this patent:

UNITED STATES PATENTS

| Number | Name | Date |
|---|---|---|
| 1,344,885 | Hall | June 29, 1920 |
| 1,717,996 | Moore, Jr. | June 18, 1929 |
| 1,779,811 | Harvey | Oct. 28, 1930 |
| 1,811,950 | Meacham | June 30, 1931 |
| 2,137,359 | Shultz | Nov. 22, 1938 |
| 2,331,000 | Shaefer | Oct. 5, 1943 |